United States Patent [19]

Horrocks et al.

[11] Patent Number: 4,678,912

[45] Date of Patent: Jul. 7, 1987

[54] APPARATUS FOR POSITIONING AN EXTERNAL RADIOACTIVE STANDARD IN A LIQUID SCINTILLATION COUNTER

[75] Inventors: Donald L. Horrocks, Placentia; Richard S. Kampf, Costa Mesa, both of Calif.

[73] Assignee: Beckman Instruments, Inc., Fullerton, Calif.

[21] Appl. No.: 537,311

[22] Filed: Sep. 28, 1983

Related U.S. Application Data

[63] Continuation of Ser. No. 483,203, Apr. 11, 1983, abandoned, which is a continuation of Ser. No. 277,791, Jun. 29, 1981, abandoned, which is a continuation of Ser. No. 166,225, Jul. 7, 1980, abandoned, which is a continuation-in-part of Ser. No. 166,223, Jul. 7, 1980, abandoned.

[51] Int. Cl.⁴ ............................................. G01T 1/00
[52] U.S. Cl. ................................. 250/328; 250/497.1
[58] Field of Search ...................... 250/328, 362, 497.1

[56] References Cited

U.S. PATENT DOCUMENTS

| | | | |
|---|---|---|---|
| 3,159,748 | 12/1964 | Aikens, Jr. | 250/497.1 |
| 3,188,468 | 6/1965 | Packard | 250/328 |
| 3,381,130 | 4/1968 | Nather | 250/362 |
| 3,480,778 | 11/1969 | Meeder et al. | 250/328 |
| 3,500,447 | 3/1970 | Frank | 250/328 |
| 3,515,876 | 6/1970 | Smith et al. | 250/328 |
| 3,553,454 | 1/1971 | Olson et al. | 250/328 |
| 3,609,362 | 9/1971 | Laney | 250/328 |
| 4,075,480 | 2/1978 | Horrocks | 250/328 |
| 4,225,790 | 9/1980 | Parsons, Jr. et al. | 250/497 |
| 4,233,517 | 11/1980 | Hooft | 250/497 |

*Primary Examiner*—Janice A. Howell
*Attorney, Agent, or Firm*—William H. May; Paul R. Harder; Steven R. Markl

[57] ABSTRACT

In a liquid scintillation counter, a standard radioactive source is supported in a bead position of a bead chain, flexible conveyor. The conveyor is guided for movement along a closed-loop conveyor path in sliding engagement within a conduit guideway for conveying the source between an operating position adjacent the counting chamber and a remote shielded position. The conveyor may support one or more sources for conveyance to one or more counting chambers along the conveyor path.

12 Claims, 3 Drawing Figures

APPARATUS FOR POSITIONING AN EXTERNAL RADIOACTIVE STANDARD IN A LIQUID SCINTILLATION COUNTER

This is a continuation of application Ser. No. 483,203, filed Apr. 11, 1983, now abandoned, which is a continuation of Ser. No. 277,791, filed June 29, 1981, abandoned, which is a continuation of Ser. No. 166,225, filed July 7, 1980, now abandoned, which is a continuation-in-part of Ser. No. 166,223, filed July 7, 1980, now abandoned.

BACKGROUND OF THE INVENTION

1. Field of the Invention

The present invention relates to scintillation counting and, more particularly, to apparatus for positioning a standard radioactive source proximate the counting chamber of a liquid scintillation counter.

2. Description of the Prior Art

Liquid scintillation techniques have been widely adopted to measure the count rate or activity of samples containing radionuclides. It is well known that materials present in the sample can affect the process by which the liquid scintillation solution responds to the radionuclide radiation thereby causing a reduction in the measured count rate. This is commonly referred to as quenching, and numerous techniques have been developed in the prior art to correct for quench in order to accurately determine the activity of the sample. One of the more widely adopted techniques is that of external standard channels ratio (ESCR) determination exemplified by U.S. Pat. No. 3,381,130. A second and pioneering technique, commonly termed H-number determination, represents an improvement over the ESCR approach and is exemplified by U.S. Pat. No. 4,075,480. In both of the foregoing techniques the sample is counted twice, once by itself and once while being irradiated by a known or standard radioactive source.

Typically, in each of the above techniques, a standard radioactive source is disposed in a carrier tube or conduit and is shifted back and fourth within the conduit between a shielded or rest location remote from the counting chamber and a counting or operating location adjacent the counting chamber. The radioactive source is usually a source of gamma radiation, such as Cesium-137, incorporated within a suitable container such as a metal ball or pellet which will slide freely within the conduit. When a sample is in position in the counting chamber, the radioactive source is shifted to its operating location to irradiate the sample, and the resulting scintillation (light flashes) emanating from the sample are counted. Thereafter, the source is returned to its shielded location and the scintillations produced solely by the radioactive sample are counted. This two-step counting procedure is repeated for each sample to be analyzed.

While various arrangements for shifting the radioactive source within the conduit have been adopted in commercial liquid scintillation counters, they have not proven satisfactory in all respects. In one approach, a pneumatic pump and a plurality of solenoid-controlled valves are connected to the conduit. In a first operating mode, the pump propels the radioactive source from its shielded location to its operating location. Then, at the conclusion of the counting operation, the valves are selectively actuated to reverse the direction of air flow in the conduit such that the pump propels the source back to its shielded location. The use of solenoid-controlled valves to control the direction of air flow results in a relatively expensive and mechanically complex control system which, in the course of switching operation, introduces undesired noise signals into the scintillation counting system.

A second and simpler approach utilizes only one-way air flow in the conduit to propel the radioactive source to the operating position at the counting chamber. After the sample is counted, the air flow is terminated, and the radioactive standard falls by gravity to the shielded location. Unfortunately, it has been found with this arrangement that the radioactive source often sticks in the operating position. Such sticking is believed due to one or both of: (1) mechanical wedging of the the source against the interior wall of the conduit and (2) static attraction between the source and the conduit wall induced by the air flow. In practice, it has been found that the radioactive source can stick in this manner as often as one time in forty. When this happens, the source remains proximate the counting chamber and continues to irradiate the sample. Since the scintillations produced by the source totally swamp scintillations produced by the sample alone, under such circumstances the second counting step for the two aforementioned quench determining techniques produces totally erroneous counting information. Moreover, the pneumatic system may allow the bead to oscillate or vibrate in the operating location adjacent a sample. In addition, the pneumatic system may not locate the source at exactly the same position for successive samples. An oscillating or othereise inaccurately positioned source can produce errors in the sample counting or calibration procedure. Finally, the radioactive source is subject to shock and vibration during shifting back and forth and particularly when striking stops at the ends of the conduit. This increases the likelihood that radioactive material will escape from the source container.

In another approach for shifting a radioactive source, exemplified in U.S. Pat. No. 3,500,447, the source is supported on the end of a cable, wire, rod, or wand and is inserted in one direction through a passage to a position directly beneath a sample to be counted and then is retracted back along the same passage to a shielded location. This approach has not been widely adopted perhaps because it has close dimensional restrictions in requiring that the source be inserted into a bore of the sample vial elevator to a position directly below the vial.

In addition to the foregoing limitations, the prior approaches exhibit dimensional and operational restrictions of source orientation with respect to the sample to be irradiated generally requiring a relatively high radioactive source strength, typically between 10–40 microcuries, which may require extra shielding and may further necessitate that some users obtain a government license to operate the instrument. The prior approaches are also limited to the positioning of a single radioactive source at a single counting chamber.

SUMMARY OF THE INVENTION

The present invention resides in a novel arrangement for positioning an external radioactive standard source in a liquid scintillation counter which overcomes the drawbacks of the prior approaches. The apparatus is simple and straightforward in construction and operation and provides for accurate positioning of a source in a location to irradiate a sample and for the controlled shifting of the source between such operating location and a shielded or storage location. The apparatus overcomes the dimensional and operational restrictions of prior approaches enabling the use of relatively low strength sources. Moreover, the apparatus is adapted for controlling a plurality of radioactive sources of like or different characteristics and for positioning such sources at one or at plural operating locations.

To the foregoing ends, the invention in one form contemplates a closed-loop, flexible conveyor for conveying the radioactive source, means supporting the radioactive source in a position along the flexible conveyor to be conveyed thereby, guide means supporting the conveyor and the source in a closed-loop conveyor path including along its length a storage location for the source remote from the counting chamber and an operating location proximate the counting chamber, and drive means coupled to the flexible conveyor and operative to drive the conveyor along the closed-loop conveyor path for conveying the radioactive source between each of the storage and operating locations and the other. In a preferred form the flexible conveyor comprises a bead chain with the radioactive source preferably supported in a bead position thereof. The guide means includes a generally tubular conduit of relatively low-friction material within which the bead chain is received for sliding movement therein along the closed loop conveyor path. With this arrangement of flexible conveyor and guide means the conveyor path is adapted to negotiate even a tortuous route around, past and through other system components between the storage and operating locations of the radioactive source.

In accordance with a further aspect of the invention, one or more beads of the chain are structured to cooperate with signalling devices for controlling conveyor movement. In one form one or more of the beads is formed of magnetic flux conducting material and cooperating magnetic sensors are positioned at selected locations along and adjacent the conveyor path. With this arrangement a control signal is generated as a magnetic bead counters a magnetic sensor for stopping the conveyor with the radioactive source in the corresponding desired operating or storage location or for otherwise controlling system operation.

The flexible conveyor arrangement of the invention is adapted to support and transport a plurality of radioactive sources of either the same or different radioactive source material and/or source strength to position selected individual ones of the sources in sequence at a counting chamber or to simultaneously position individual sources at different ones of plural counting chambers for simultaneous counting operations therein.

Other advantages and aspects of the present invention will be apparent from the following detailed description taken in conjunction with the accompanying drawings.

DESCRIPTION OF THE PREFERRED EMBODIMENT

Figure 1:
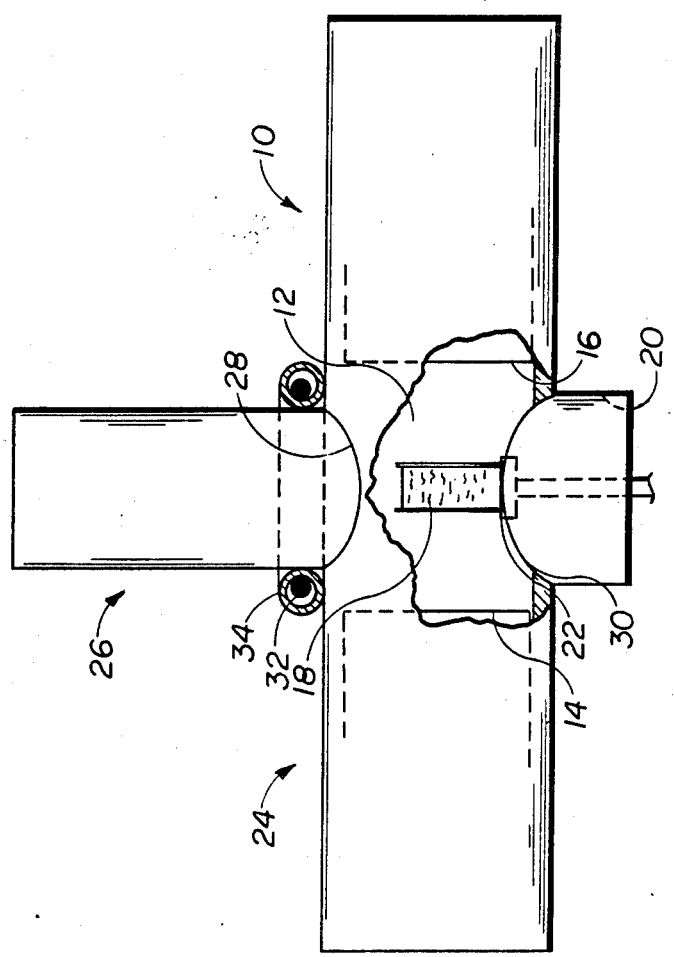
FIG. 1 is a side elevational view of a liquid scintillation counter subassembly cut away in part to illustrate the counting chamber and sample vial disposed therein. The figure further illustrates the source positioning apparatus of the invention oriented vertically above the sample.

As shown in the drawings and particularly FIG. 1 thereof, the invention is embodied in a liquid scintillation counter including a sample counting chamber housing 10 having a counting chamber 12 positioned between a pair of horizontally extending photomultiplier detectors 14 and 16. The detectors are adapted to detect light flashes from a liquid scintillator in a sample vial 18 positioned in the counting chamber. In this regard, sample vials 18 are delivered by a conveyor (not shown) to a location either below or above housing 10. Each vial is either elevated or lowered into the counting chamber 12 through a vertical passage 20 by an elevator 22 and is lowered or raised back to the conveyor after the counting operation. Housing 10 is structured to include a generally horizontally disposed tubular section 24 receiving and supporting both photomultiplier detectors and an intersecting vertical tubular section 26 providing access to the counting chamber from above or below through vertical passage 20 therein. Tubular sections 24 and 26 intersect one another along upper and lower joints 28 and 30.

Figure 2:
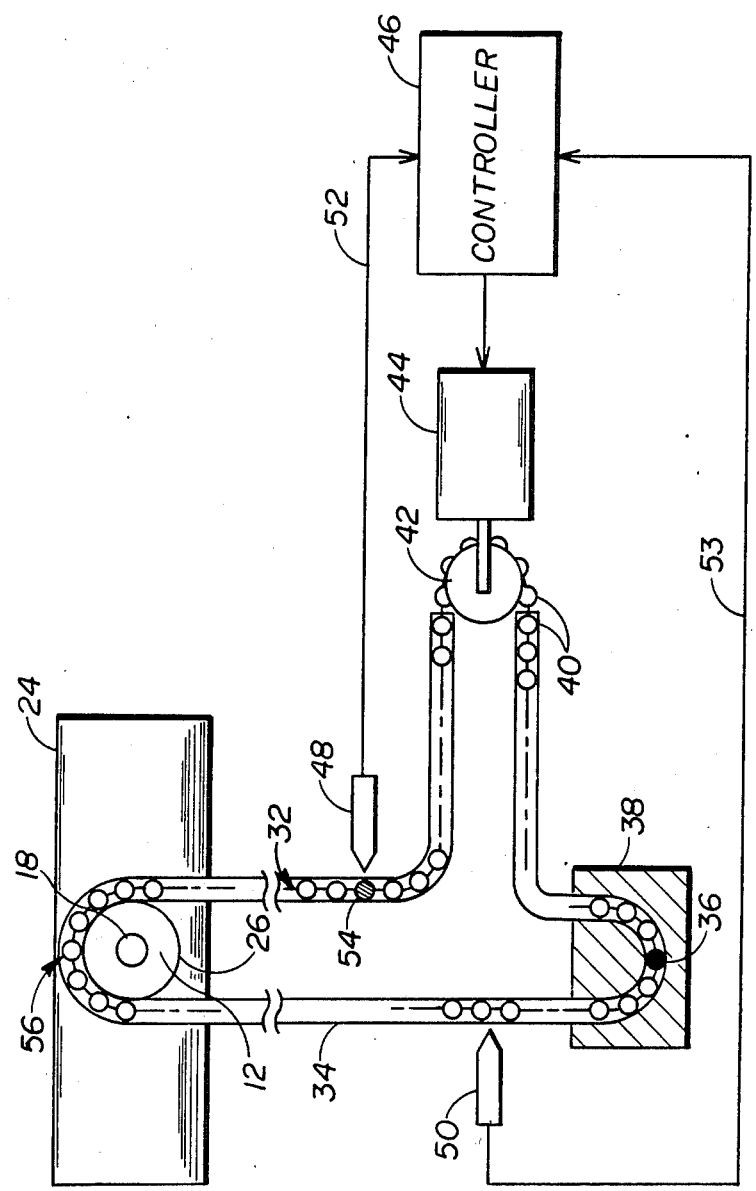
FIG. 2 is a generally diagrammatic view taken in the direction of line 2—2 of FIG. 1 illustrating the source positioning apparatus of the invention.

In accordance with a primary aspect of the present invention, referring to FIG. 2, a flexible conveyor 32 and cooperating guideway 34 establish a closed-loop path of conveyor movement for conveying a standard radioactive source 36 supported by the flexible conveyor between an operating position proximate the counting chamber 1 and a storage or shielded location 38 remote therefrom. In the preferred embodiment the flexible conveyor is provided by a flexible chain the individual links or sections of which are structured as spherical beads 40 serially connected as illustrated. Conveyor guideway 34 is provided as a generally tubular conduit within which the flexible bead chain conveyor 32 is disposed for movement along the closed-loop conveyor path. To this end the conduit is preferably a material exhibiting a low coefficient of friction to facilitate sliding movement of the bead chain therein. Moreover, the conduit desirably is a material which can be shaped, formed, or otherwise molded in tortuous, serpentine, or other such configuration to establish a conveyor path which passes around other system components traversing bends, corners, and other obstacles. Plastic materials such as nylon, Teflon, and polyethylene are suitable materials of this nature for conduit 34.

Still referring to FIG. 2 a short section of conduit 34 is omitted to allow a drive sprocket 42 to engage a 180° loop of the bead chain 32. Sprocket 42 is in turn coupled to a drive motor 44 controlled by system controller 46 to rotate the drive sprocket causing movement of the conveyor along the closed-loop path in sliding engagement within conduit guideway 34. Motor 44 may be a reversible motor enabling the conveyor to be driven in a counterclockwise or clockwise direction, or both, as desired.

In accordance with a further aspect of the invention, flexible conveyor 32 supports radioactive source 36 for conveyance. In the bead chain configuration, the source is received within a bead and is hence supported in a bead position of the chain. To this end one of the individual beads 40 is configured to receive and support the radioactive source therein, and a one-quarter inch diameter bead is suitable for this purpose. To this end, a diametrical bore (not shown) is drilled into the source receiving bead 40, the radioactive source (e.g. cesium-137 or other suitable radioactive material) is inserted into the diametrical bore, and the bore is suitably capped, for example by means of a spot weld or with epoxy sealant or the like.

As illustrated in FIG. 2, the storage location 38 for the radioactive source is provided by a lead shielding block in the path of the conveyor and through which the conveyor 32 passes. In FIG. 2, the bead supporting the radioactive source 36 is illustrated situated in its shielded or rest position within lead shielding block 38.

The operating location of radioactive source bead 36 proximate counting chamber 12 is established by the orientation of the conveyor path 32 past the counting chamber. As illustrated in FIG. 2, the conveyor is disposed in a 180° loop around vertical section 26 of the counting chamber housing. As illustrated in FIGS. 1-2, conduit 34 traverses the region of the counting chamber in a semicircular path at a fixed radial or circumferential distance from the vertical axis of the cylindrical sample vial 18 and with the semicircular path of conduit 34 being disposed in a generally horizontal plane displaced vertically above the sample vial and its contents.

In accordance with a further aspect of the invention, one or more sensors 48 and 50 are illustrated along the closed-loop path for monitoring the position of the bead chain conveyor 34 and hence of the source bead 36 conveyed thereby, and for supplying control signals over lines 52, 53 to motor controller 46 to approximately inhibit or advance movement of the conveyor. To this end, in a preferred form, one of the beads 40 is formed of a material which conducts magnetic flux, such as carbon steel, and the remaining beads are formed of a material which is a relative nonconductor of magnetic flux, such as stainless steel or plastic, for example. Sensors 48 and 50 are magnetic sensors, such as conventional Hall-effect switches, positioned to signal the presence or absence of a magnetic flux conductive bead adjacent a respective sensor. In the arrangement depicted in FIG. 2, the magnetic flux conductive bead, there identified by numeral 54, is disposed adjacent sensor 48 when radioactive source bead 36 is at the storage location within lead shielding block 38. Sensor 50 is positioned at a location traversed by the magnetic bead 54 when the radioactive source 36 is in an operating location proximate the counting chamber for irradiating the sample therein. This operating position proximate the counting chamber is illustrated in FIG. 2 by numeral 56 at the 90° point in the 180° conveyor path around vertical tubular section 26 of housing 10. However, in view of the orientation of the semicircular conveyor path a fixed vertical distance above vial 18 and a fixed radial distance from the vertical axis of the vial, the operating position 56 of the source can be at any point along the semicircular path.

While magnetic sensor control of the conveyor 32 has been illustrated and described, it should be understood that other forms of sensor control are equally feasible including but not limited to optical sensors, mechanical sensors, eddy current or other electrical sensors and switching devices.

In operation, assuming counterclockwise conveyor movement, motor 44 rotates drive sprocket 42 to drive flexible conveyor 32 and hence to drive radioactive source bead 36 supported thereby from the shielded position in block 38 to the operating position at 56 at which time sensor 50 responds to magnetic flux conductive bead 54 and signals controller 46 to stop the motor drive. A counting operation is then performed on the sample 18 in a normal fashion with the sample irradiated by the radioactive source 36. At the conclusion of this counting step, controller 46 supplies a drive signal to actuate motor 44 to convey the source back to the shielded position in block 38. Arrival of magnetic bead 54 at sensor 48 causes the sensor to signal controller 46 to stop the motor drive with source bead 36 in the shielded location in block 38. Counting is then performed on the sample in the absence of the standard radioactive source in a conventional manner. The sample 18 is then removed from the counting chamber and replaced by the next sample to be counted.

An advantage of the source conveying arrangement of FIGS. 1-2 resides in the fact that conduit tubing 32 can extend in a tortuous path around and past other elements of the liquid scintillation counter and flexible conveyor bead chain 34 travel through the tubing with very little drag and easily negotiates even reverse bends in the tubing. Moreover, the tubing can be arranged in extremely close proximity to the counting chamber 12 and the vial 18 therein and the tubing, being plastic, does not appreciably absorb, scatter, or otherwise impede passage of radiation from the source to the sample. Moreover, the precise control by the sensors 48, 50 and bead 54 provides for highly accurate and repeatable positioning of the source 36 at operating position 56 and other positions in the conveyor path. In addition, the radioactive source in the illustrated apparatus is not subject to excessive shock or vibration as it is conveyed from one location to the other in the closed-loop conveyor path and hence the radioactive material is less likely to escape from the source bead. Moreover, the magnetic sensor feedback control of drive motor 44 provides for accurate repetitive positioning of the source with respect to the counting chamber. However, arcuate 180° conveyor path around the sample vial 18 eliminates, for same samples and sources, the need to repeatedly position the source precisely at the same operating position 56, since source positioning anywhere along the 180° path is acceptable for counting the sample. Further, the orientation at and close proximity of the conveyor path to the counting chamber enables the strength of radioactive source 36 to be decreased to a level below that presently used. This lower source strength may be deemed nonhazardous and if it is of a sufficiently low level may preclude the need for a government license under present government standards. Obviously, too, the smaller source and attendant reduced radiation shielding requirements lowers the overall weight and cost of the system.

Figure 3:
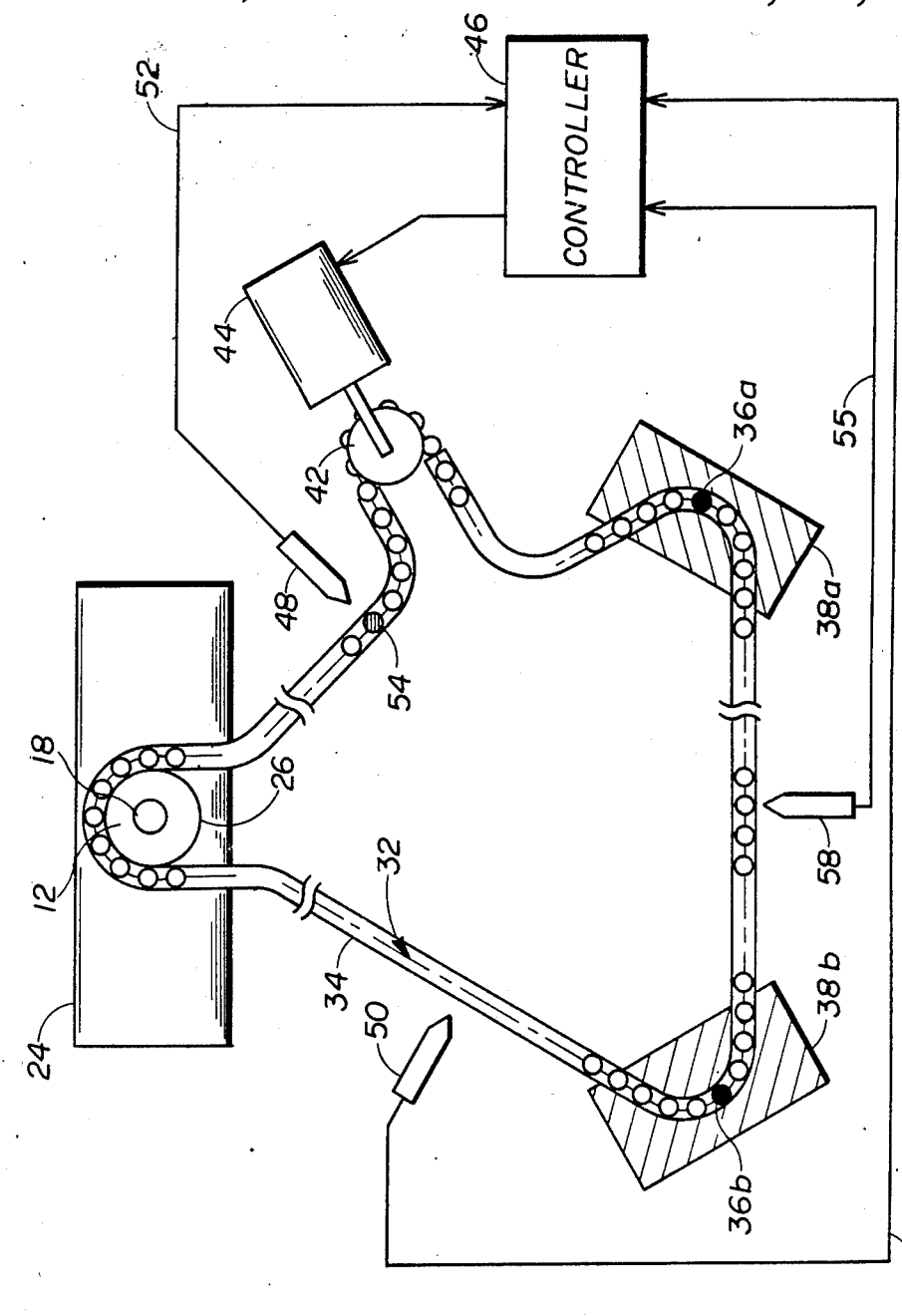
FIG. 3 is a view like FIG. 2 illustrating a modified form of source positioning apparatus.

FIG. 3 illustrates a further embodiment of the invention in which flexible conveyor 34 supports a plurality of radioactive sources 36a and 36b and a corresponding plurality of lead shielding blocks 38a and 38b. The conveyor is illustrated in FIG. 3 in a position with the respective sources conveyed to the respective storage location within the respective shielding blocks. Moreover, three magnetic sensors 48, 50 and 58 are positioned around the closed-loop conveyor path as illustrated and are coupled to controller 46 over respective control lines 52, 53, and 55. With this arrangement, sources 36a and 36b may be the same isotope of like or different source strengths or may be different isotopes altogether. The sources are arranged to be conveyed and individually positioned at the operating location adjacent sample chamber 12. In this regard, magnetic sensor 48 senses the position of magnetic bead 54 with both sources 36a and 36b in their shielded position as illustrated. Sensor 50 responds to the position of bead 54 with source 36a in operating position at the counting chamber 12 and with source 36b in a storage location within block 38a. Sensor 58 senses the position of magnetic bead 54 with source 36a in shielding block 38b and with source 36b at the counting chamber. With the arrangement of FIG. 3, each source may be conveyed and positioned individually and sequentially at the counting chamber 12 to perform different counting operations on the sample.

The positioning apparatus of FIG. 3 may be modified to incorporate one or more additional counting chamber(s) 12 (not shown) in the closed loop path along with additional radioactive source beads 36 thereby allowing the respective sources to be positioned simultaneously in respective ones of the plural counting chambers to perform simultaneous counting operations therein.

Moreover, while several preferred embodiments of the invention have been illustrated and described, various modifications may be made without departing from the spirit and scope of the invention as defined in the following claims.

What is claimed is:

1. In a liquid scintillation counter having a counting chamber for receiving a sample containing a scintillator substance and a sample of a radioactive substance to be counted, improved apparatus for positioning a radioactive source in an operating location to irradiate the sample in the counting chamber comprising, in combination:
   (1) a continuous bidirectionally flexible conveyor forming a closed loop for conveying the radioactive source through on operating location and a storage location;
   (2) means supporting the radioactive source at a position along the flexible conveyor for conveyance thereby;
   (3) guide means for supporting the conveyor and for guiding conveyor movement along a selected path, said path traversing at spaced positions the storage location for the radioactive source remote from the counting chamber and the operating location for the radioactive source near to the counting chamber; and
   (4) drive means coupled to said continuous flexible conveyor to draw the conveyor around said path for conveying the radioactive source through said spaced storage and operating locations.

2. The combination of claim 1 including additionally a plurality of means for supporting radioactive sources along the flexible conveyor.

3. In a liquid scintillation counter having a counting chamber for receiving a sample containing a scintillator substance and a sample of a radioactive substance to be counted, improved apparatus for positioning a radioactive source in an operating location to irradiate the sample in the counting chamber, comprising, in combination:
   a continuous flexible conveyor for conveying the radioactive source through an operating location and a storage location, said conveyor comprising a plurality of spherical elements, each element serially interconnected with other spherical elements by linkage elements to form a flexible bead chain;
   means for supporting the radioactive source by a spherical element along said flexible conveyor for conveyance thereby;
   a conduit receiving said continuous flexible conveyor for supporting the conveyor and for guiding movement of the conveyor to follow a selected circuitous conveyor path, said path traversing at spaced positions the storage location for the radioactive source remote from the counting chamber and the operating location for the radioactive source near the counting chamber, said conduit receiving said conveyor along at least a portion of said path and providing a guide to corner said conveyor to follow said path, said conduit having a generally tubular shape, and having a curved configuration, to guide the flexible conveyor through a tubular bore thereof; and
   drive means coupled to said continuous flexible conveyor to drive the conveyor for conveying the radioactive source around said selected path and through said spaced storage and operating locations.

4. The combination of claim 3 wherein the support means for the radioactive source comprises a bead of the flexible bead chain within which the radioactive source is secured.

5. The combination of claim 1 or 3 including a plurality of counting chambers positioned along the conveyor path providing a plurality of operating positions through which the radioactive source(s) are conveyed.

6. The combination of claim 1 or 3 including sensing means along the conveyor path responsive to conveyor position for controlling operation of the drive means.

7. The combination of claim 6 wherein said continuous flexible conveyor includes one or more spherical elements comprised of magnetic material to which said sensing means is responsive to selectively indicate the position of the radioactive source on said conveyor path.

8. The combination of claim 3 wherein said conduit which guides said continuous flexible conveyor along a conveyor path through an operating position near to the counting chamber includes an arcuate path section circumferentially positioned to and radially spaced a fixed distance from an axis extending through the position of a sample in the counting chamber, said path section defining a range of operating locations along the arcuate path section in which the radioactive source may be positioned for equivalent irradiation of the sample.

9. The combination of claim 8 wherein said arcuate path section surrounds the sample position for approximately 180° of rotation about said axis through said sample position.

10. The combination of claim 8 wherein said arcuate path section is disposed in a plane displaced from said sample position along said axis through said sample position.

11. The combination of claim 1 wherein said continuous flexible conveyor comprises interlinked elements.

12. In a liquid scintillation counter, having a counting chamber for receiving a sample containing a scintillator substance and a sample of radioactive substance to be counted, an improved apparatus for positioning a radioactive source in an operating location to irradiate the sample in the counting chamber, comprising:
   a continuous flexible conveyor for conveying the radioactive source through an operating location and a storage location, said conveyor comprising a plurality of elements, each element interconnected with one other element to form a flexible chain;

a conduit for receiving said continuous flexible conveyor for supporting and guiding the conveyor as the conveyor moves along a selected continuous path, said path including a storage location and an operating location for the radioactive source near the counting chamber;

drive means coupled to said continuous flexible conveyor to drive the conveyor for moving the radioactive source around the selected path and through said storage and operating locations;

a drive means controller;

sensors positioned along the path of the conveyor for sensing particular elements uniquely detectable by said sensors for monitoring the position and location of element comprising the conveyor, said sensors supplying control signals to said drive means controller to inhibit or advance bidirectional movement of the conveyor by controlling the manner in which the drive means is operated, said sensors and said controller cooperatively associated to provide feedback control of the drive means to provide for accurate repetitive positioning of the source with respect to the accurate repetitive positioning of the source with respect to the counting chamber.

* * * * *

UNITED STATES PATENT AND TRADEMARK OFFICE
CERTIFICATE OF CORRECTION

PATENT NO. : 4,678,912

DATED : July 7, 1987

INVENTOR(S) : Donald L. Horrocks and Richard S. Kampf

It is certified that error appears in the above-identified patent and that said Letters Patent is hereby corrected as shown below:

Column 10, line 12 and 13    after "respect" delete "to the accurate repetitive positioning of the source with respect"

Signed and Sealed this

Twelfth Day of July, 1988

Attest:

DONALD J. QUIGG

Attesting Officer        Commissioner of Patents and Trademarks